United States Patent [19]

Smith et al.

[11] Patent Number: 4,530,402
[45] Date of Patent: Jul. 23, 1985

[54] LOW DENSITY SPACER FLUID

[75] Inventors: Robert C. Smith, Inola; George B. Holman, Jr., Tulsa, both of Okla.

[73] Assignee: Standard Oil Company, Chicago, Ill.

[21] Appl. No.: 527,902

[22] Filed: Aug. 30, 1983

[51] Int. Cl.³ .................... E21B 33/13; E21B 37/00
[52] U.S. Cl. ................................ 166/291; 166/285; 166/292
[58] Field of Search .............. 166/285, 292–295, 166/312

[56] References Cited

U.S. PATENT DOCUMENTS

| | | | |
|---|---|---|---|
| 3,030,215 | 4/1962 | Veatch et al. | |
| 3,365,315 | 1/1968 | Beck et al. | |
| 3,669,701 | 6/1972 | Biederman, Jr. | 166/292 |
| 3,688,845 | 9/1972 | Messenger | 166/291 |
| 3,722,591 | 3/1973 | Maxson | 166/295 |
| 3,804,058 | 4/1974 | Messenger | 166/292 |
| 4,141,843 | 2/1979 | Watson | 166/291 |
| 4,234,344 | 11/1980 | Tinsley et al. | 166/292 |
| 4,252,193 | 2/1981 | Powers et al. | 166/292 |
| 4,370,166 | 1/1983 | Powers et al. | 106/97 |
| 4,423,781 | 1/1984 | Thomas | 166/312 |

OTHER PUBLICATIONS

Cementing Spacers and Washes Improve Production, by Griffin, Jr. et al., The Oil and Gas Journal, Sep. 12, 1977.

*Primary Examiner*—Stephen J. Novosad
*Assistant Examiner*—William P. Neuder
*Attorney, Agent, or Firm*—Scott H. Brown; Fred E. Hook

[57] ABSTRACT

A method of completing a wellbore is disclosed wherein a low density spacer fluid is introduced into a wellbore and then a completion fluid, such as a cement slurry, to displace the spacer fluid. The spacer fluid comprises a nonagglomerating carrier fluid, such as water or the like, and discrete dispersible density reducing bodies, such as hollow spheres. The density reducing bodies aid in reducing the hydrostatic head of the spacer fluid, completion fluid, and existing wellbore fluids to prevent the hydrostatic head of such fluids from exceeding the fracture gradient of a highly porous, easily fractured formation.

17 Claims, 2 Drawing Figures

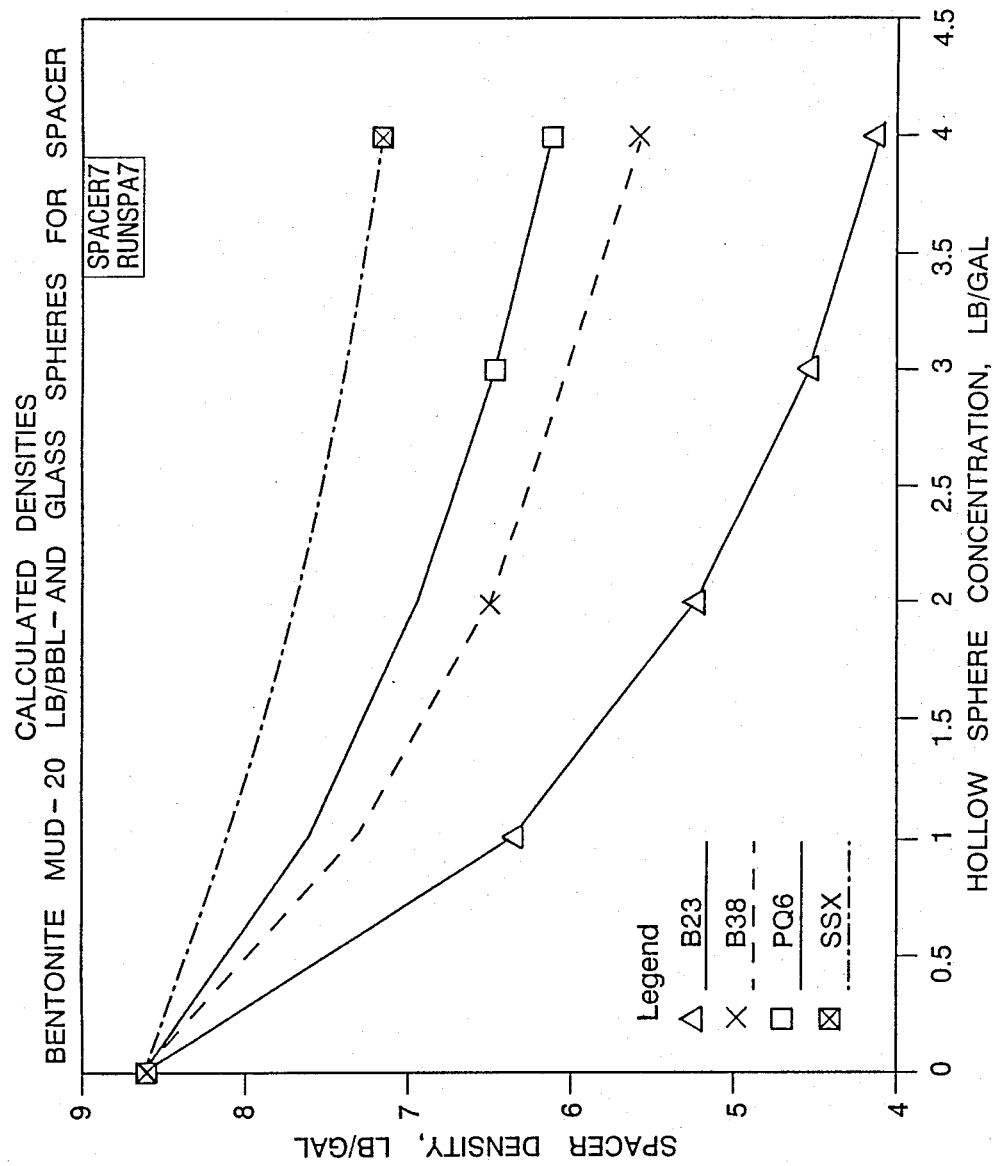

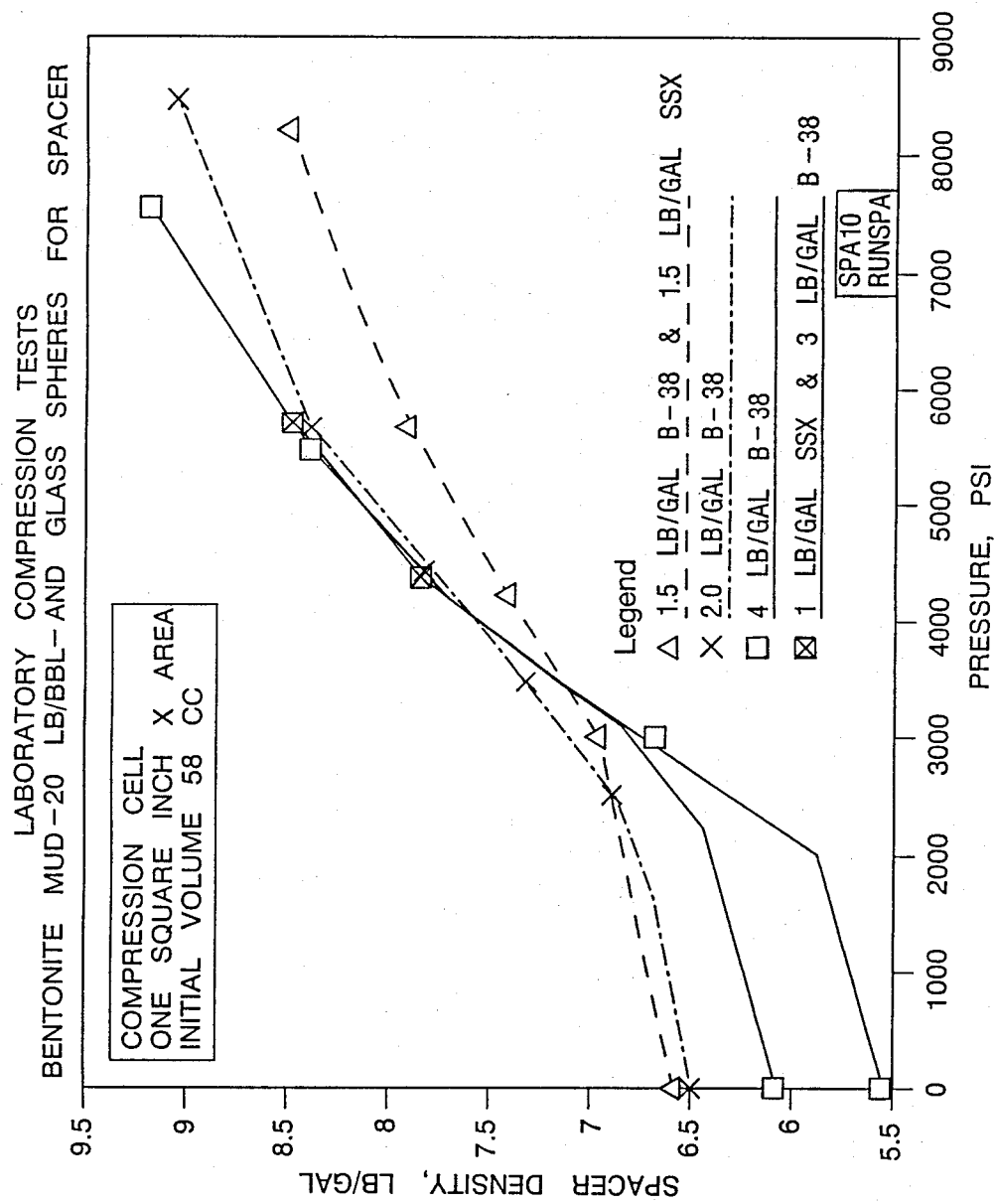

LOW DENSITY SPACER FLUID

BACKGROUND OF THE INVENTION

1. Field of the Invention

The present invention relates to a method of completing a wellbore and, more particularly, to such a method wherein a spacer fluid is introduced into a wellbore and then a completion fluid to displace the spacer fluid and the spacer fluid is a low density fluid.

2. Setting of the Invention

In rotary drilling of wells, a drilling fluid is usually circulated down the drill string and back up the annulus between the drill string and the wellbore face. The drilling fluid can contain many different chemicals, but will most often contain a viscosifier, such as bentonite. When a casing or tubing string is to be cemented into the wellbore, any drilling fluid and remnants of the viscosifier present in the wellbore are preferably removed to aid the bonding of the cement between the casing or tubing string and the wellbore. In removing this drilling fluid from the wellbore and to clean the annulus, a wash or spacer fluid can be introduced ahead of the cement slurry, as is described in "Cementing Spacers and Washes Improve Production" by T. J. Griffin, et al., Oil and Gas Journal, Sept. 12, 1977.

The spacer fluids can contain: a weighting material, such as barite, to increase its density for better cleaning, as is described in U.S. Pat. No. 4,141,843 to Watson; a tar-like material or other oil-based materials, as described in U.S. Pat. No. 3,688,845 to Messenger for compatibility with wellbore fluids; and/or abrasive particles, such as sand, for cleaning the annulus and removal of unwanted material from the wellbore. These additional materials all can significantly increase the density of the spacer fluid, which is not always desirable.

One situation where the density of a spacer fluid is not desired to be increased is when a wellbore is completed through a highly porous and/or fractured formation. In this case, lost circulation material is usually added to the spacer fluid and/or cement slurry to prevent the introduced fluids from being lost into the porous formation. The use of lost circulation material is usually not desired because it is difficult to clean out of the wellbore prior to cementing and, if added to the cement slurry, can adversely effect the cement quality. Also, these highly porous formations are not capable of withstanding without fracturing the hydrostatic head in the wellbore of the spacer fluid, the wellbore fluids, and a completion fluid, such as a cement slurry. Obviously, the addition of lost circulation material will not prevent the opening of these formation fractures. A completion method is needed which includes a way to decrease the hydrostatic head of the fluids in the wellbore to reduce the likelihood of and to prevent the fracturing of the porous formations.

A method has been developed to decrease the hydrostatic head of fluids in a wellbore by reducing the density of certain fluids, including the spacer fluids and/or the cement slurries, and uses nitrogen gas pumped into the fluid to reduce the density thereof. The reduced density of the fluids thereby reduces the hydrostatic head of fluids in the wellbore to reduce the likelihood of fracturing the porous formation. This method has serious drawbacks, however, including the aspect that nitrogen can be difficult to use effectively in the field because the nitrogen gas separates out from the fluids at the pressures needed to be used in the wellbore and, when the gas separates it forms a gaseous bubble within the wellbore which can cause severe completion problems. Also, additional wellhead equipment is needed for the injection of the gas and a backpressure in the annulus is required to keep the gas in suspension in the fluids. This backpressure, which can be about 600–800 psi, is undesirable because all efforts need to be made to reduce, not add to, the pressure of the fluids on the formation.

SUMMARY OF THE INVENTION

The present invention provides a low density spacer fluid and related method of use for completing a wellbore. The invention is particularly adapted for use when completing a wellbore through a formation which is highly porous and has a low fraction gradient. In the method of this invention, a low density spacer fluid is introduced into the wellbore, and a completion fluid, such as a cement slurry, is introduced to displace the spacer fluid out of the wellbore. The low density spacer fluid is comprised of a carrier fluid, which can contain a viscosifying agent, and discrete dispersible density reducing bodies, such as hollow glass microspheres.

When the low density spacer fluid is introduced into the wellbore, the hydrostatic head of the wellbore fluids, the completion fluid, and low density spacer fluid, can be adjusted to be below the fracture gradient of the formation, thereby allowing completion of the wellbore without opening fractures in the formation.

BRIEF DESCRIPTION OF THE DRAWINGS

FIG. 1 is a graphical representation of the calculated densities of four low density spacer fluids with varying concentrations of density reducing bodies.

FIG. 2 is a graphical representation of the density of four low density spacer fluids vs pressure.

DETAILED DESCRIPTION OF THE PREFERRED EMBODIMENT

The present invention is a low density spacer fluid and related method of use and comprises introducing a low density spacer fluid into the wellbore, and introducing a completion fluid to displace the spacer fluid, wherein the low density spacer fluid comprises a carrier fluid and discrete dispersible density reducing bodies. The term spacer fluid as used herein means a pumpable aqueous fluid which is introduced into a wellbore to separate wellbore fluids from a completion fluid, such as a cement slurry, and which is nonsetting and nonagglomerating, as like a cement slurry.

The low density spacer fluid of the present invention can be formulated to have a wide range of densities, for example, the density can be less than water (8.33 pounds per gallon (ppg)), so when it is used in completing a wellbore, the hydrostatic head in the wellbore of the spacer fluid, wellbore fluids, and the completion fluid, such as a cement slurry, is less then the fracture pressure of the formation. For the greatest reduction in the hydrostatic head, the present invention is very effective when used in cementing a wellbore with a low density cement, such as described in U.S. Pat. Nos. 3,722,591, 3,804,058, 4,252,193, and 4,370,166. When the low density spacer fluid is used in conjunction with a low density cement, very deep wells (greater than 10,000 ft) can be effectively cemented through highly porous formations, such as these with fracture gradients of less than about 0.40 psi/ft.

The low density spacer fluid is preferably formulated to be compatible with water-based drilling fluids, including lignosulfonate and polymer types, and oil-based drilling fluids. The term "compatible" as used herein means that the fluid does not cause undesired reactions in or with or significant alternation of the properties, such as rheology, etc., of the other fluids in the wellbore. The low density spacer fluid can be formulated to be compatible with the completion fluids commonly used in well completions and will not affect the completion fluid's viscosity. Common completion fluids can include solutions of salt which are water soluble, stable, and nonreactive with other solution components of the formation. Suitable salts include calcium chloride, potassium chloride, sodium bromide, sodium chloride, mixtures of calcium chloride, and calcium bromide, and mixtures of zinc bromide, calcium bromide and calcium chloride.

The carrier fluid utilized in the present invention can be an aqueous fluid, such as water, hydrocarbon-based liquids, emulsion, acids, or mixtures thereof. The preferred carrying fluid depends upon the type of drilling fluid utilized in drilling the wellbore, cost, availability, temperature stability, viscosity, clarity, and the like. Based on cost and availability, water is preferred. For the purposes of this discussion, the carrying fluid will be assumed to be water or a water-based fluid unless otherwise stated.

The carrier fluid itself, or in combination with a viscosifier, preferably has sufficient viscosity to maintain the discrete dispersible density reducing bodies in suspension when introduced into the wellbore. In certain situations it has been found that water, which has a viscosity of 1 cp, can be used alone as the carrier fluid when the low density spacer fluid is introduced into the wellbore in turbulent flow and without an interruption or shutdown for longer than about one hour. The carrier fluid can have a viscosity greater than about 4 cp but less than the viscosity which would make the low density spacer fluid unpumpable, such as about 6,000 cp. The preferred viscosity of the carrier fluid is about 15 cp to about 900 cp, and most preferably from about 20 cp to about 750 cp.

While hydrocarbon-based liquids and aqueous emulsions can by themselves have the desired viscosity as a carrier fluid, when acids or water are used, a viscosifier is normally desired. The term "viscosifier" includes any agent that increases the viscosity of a fluid, and preferably produces a low density spacer fluid which is compatible with the drilling fluids and the completion fluid. Agents which are useful as viscosifiers include, but are not limited to, colloidal agents, such as clays, polymers, guar gum; emulsion forming agents; dietamatous earth; and starches. Suitable clays include kaolines, bentonite, hydrous micas, attapulgite, sepiolite, and the like and also synthetic clays, such as laponite. Suitable polymers include carboxylmethyl cellulose, hydroxymethyl cellulose and the like. The choice of a viscosifier depends upon the viscosity desired, chemical capability with the other fluids, ease of filtration to remove solids from the low density spacer fluid. Preferably, the viscosifier is easily flocculated and filterable out of the spacer fluid. The viscosifier can be added to the carrying fluid in the amount of from greater than 0 ppb (pounds per barrel) to about 90 ppb of carrier fluid. The preferred range is from about 1 ppb to about 45 ppb to keep the viscosity of the carrier fluid in the preferred ranges.

Another consideration in formulating the low density spacer fluid is the temperature and pressure environment of the wellbore. In completing wellbores in arctic regions, the spacer fluid needs to be pumpable at temperatures as low as about 18° F., and in completing wellbores in deep wells the spacer fluid needs to be stable where the temperatures can be as high as about 400° F. at about 22,000 psi pressure.

A very useful carrier fluid is a thixotropic colloidal fluid with a gel strength, i.e., a fluid which upon agitation or circulation has a measurable relatively low viscosity and is free flowing, particularly at high temperatures; but when such agitation or circulation is halted, the fluid retains its gel strength. The rate of gel formation after agitation can be reduced to such that drilling fluids and debris contained in the fluid is permitted to fall a short distance before the gel structure is sufficiently strong to support the drilling fluids and debris. Also, when such spacer fluids with the proper viscosity, the proper gel rate and the proper gel strength are circulated through a wellbore, the spacer fluid preferably has sufficient high viscosity to carry drilling fluids and debris from the bottom of the wellbore to the surface and with a gel strength to allow drilling fluids and debris to settle in a settling pit. On standing in a quiescent state, this spacer fluid preferably develops sufficient gel strength to prevent the settling of drilling fluids and debris in the casing when it becomes necessary to discontinue circulation for any appreciable period of time.

Further, the spacer fluid is preferably pumped into the wellbore in amounts and flow rates such that plug, turbulent or laminar flow exists in the annulus between the tubing and the casing or the casing and the wellbore for better cleaning. The spacer fluid is preferably pumped so that the two portions, i.e., the forward portion between the wellbore fluids and spacer fluid and the back portion between the spacer fluid and the completion fluid, such as a cement slurry, do not mix, thus the preferred flow rate will minimize front and back mixing. Such flow rates can be from about 1 bpm to about 25 bpm.

The discrete dispersible density reducing bodies can be float ash, hollow glass microspheres, hollow spheres formed from other materials and the like, which when suspended in a fluid will reduce the overall density of the fluid. The term "discrete" means that the bodies are individually operable while the term "dispersible" means that a plurality of the bodies are not accumulated into a mass but are dispersed or suspended within the carrier fluid. The density reducing bodies preferably have hard shells or are formed from a hard material to reduce the likelihood of breakage or degradation when mixed with the carrier fluid and pumped into the wellbore. Most preferably the bodies are hollow glass microspheres, which can be manufactured by procedures such as described in U.S. Pat. Nos. 3,365,315 and 3,030,215.

High strength glass, such as borosilicate glass, can be used to produce these hollow glass microspheres to have hydrostatic collapse strengths of greater than 5000 psi as determined by the American Society of Testing and Materials Procedure described in ANSI/ASTM D 3102-72. Certain hollow glass microspheres, called SSX spheres and described in U.S. Pat. No. 4,391,646, have been developed with average true particle densities of greater than 0.5 grams per cubic centimeter and more specifically about 0.8 grams per cubic centimeter with ANSI/ASTM hydrostatic collapse strengths of greater than 5000 psi, and on the order of 8000–10,000 psi. All of these microspheres generally are manufactured to have average true particle diameters of about 10 to about 400 microns.

Examples of the holllow glass microspheres which have been found to be useful in formulating the low densitiy spacer fluid of this invention are shown in Table I.

TABLE I

| Free-Flowing Hollow Sphere Properties-Typical | | | |
|---|---|---|---|
| Type | IG101 | IGD101 | B23/500 |
| Made by*: | E-C | E-C | 3M |
| Glass**: | SB | SB | SLB |
| Type ANSI/ASTM average true particle density (gm/cm³) | 0.31 | 0.3 | 0.23 |
| Range of particle diameter, (microns) | 40–175+ | 40–150 | 20–130 |
| ANSI/ASTM hydrostatic collapse strength at 10 vol. percent collapse, | | | |
| (psi) | unknown | unknown | 500 |
| (kPa) | unknown | unknown | 3447 |
| Hydrostatic collapse strength-volume percent survivors at 1500 psi (10340 kPa) | 47 | 76.6 | unknown |
| Softening temperature (°C.) | 480 | 480 | 715 |
| Type | B37/2000 | B38/4000 | SSX | PQ 600 |
| Made by*: | 3M | 3M | 3M | PQ |
| Glass**: | SLB | SLB | SLB | SB |
| Type ANSI/ASTM average true particle density (gm/cm³) | 0.37 | 0.38 | 0.62 | .45 |
| Range of particle diameter, (microns) | 20–130 | 20–130 | 20–200 | 10–185 |
| ANSI/ASTM hydrostatic collapse strength at 10 vol. percent collapse, | | | | |
| (psi) | 2000 | 4000 | 8000 | 2500 |
| (kPa) | 13790 | 27579 | 55162 | 17235 |
| Hydrostatic collapse strength-volume percent survivors at 1500 psi (10340 kPa) | unknown | unknown | unknown | unknown |
| Softening temperature (°C.) | 715 | 715 | 800 | unknown |

*E-C means Emerson & Cuming, Inc., Canton, Massachusetts
3M means 3M Manufacturing Co., St. Paul, Minnesota
PQ means PQ Corporation, Valley Forge, Pennsylvania
**SB is sodium borosilicate glass
SLB is soda lime borosilicate glass
(Note: Both sodium borosilicate glass and soda lime borosilicate glass are referred to generically as "sodium borosilicate glass" or "borosilicate glass", with a thermal conductivity of 0.3 to about 1.1 Kg-cal/(hr)(sqm)(C]o$/m) while glass microspheres have thermal conductivities of about 0.02 to about .18 Kg-cal/(hr)(sqm)(c]o$/m).

The density reducing bodies are added to the carrier fluid at the surface through bulk mixers and the like, as is well known in the art. The density reducing bodies can be added to the carrier fluid in ranges from above 0 ppg to about 15 ppg of carrier fluid, depending upon the desired density of the spacer fluid. Preferably, the bodies are added to the carrier fluid in the amount of from less than about 1 ppg to about 5 ppg. The calculated densities of four spacer fluids having varying amounts of density reducing bodies, are shown in FIG. 1.

Further, tests were conducted to find the density and viscosities of different low density spacer fluids of the present invention after being subjected to pressures as would be encountered in typical wellbore completions. In these tests, water was mixed with 120 ppb of bentonite and varying amounts of the density reducing bodies. The results of these tests are shown in FIG. 2.

Table II illustrates the viscosities and other properties of different low density spacer fluids.

TABLE II

| Bubble Spacer Viscosities | | | | | | | |
|---|---|---|---|---|---|---|---|
| | | Fann Readings at 80° F. RPM | | | | | |
| Fluid | Density #/Gal | 600 1022 | 300 511 | 200 Sec-1 340 | 100 170 | 6 10 | 3 5 |
| 1. Guar (15#/1000 gal) | 8.33 | 9 | 5 | 4 | 2 | 1 | 1 |
| 2. Guar +2#/gal B-38 bubbles | 6.3 | 63 | 42 | 32 | 20 | 4 | 2 |
| 3. Drilling Mud 10#/bbl Bentonite | 8.5 | 8 | 5 | 3 | 2 | 1 | 1 |
| 4. Drilling Mud 10#/bbl Bentonite 2#/gal B-38 bubbles | 6.4 | 35 | 20 | 14 | 7 | 2 | 1 |
| 5. Drilling mud 20#/bbl Bentonite | 8.6 | 25 | 15 | 11 | 7 | 2 | 1 |
| 6. Drilling Mud 20#/bbl Bentonite 2#/gal B-38 bubbles | 6.5 | 85 | 50 | 37 | 22 | 4 | 3 |

| Apparent Viscosity cps | Viscosity, cps | | n' | K' | Friction Pressure 5 BPM 7" Csg × 9" hole psi/1000' |
|---|---|---|---|---|---|
| | 170 sec-1 | 511 sec-1 | | | |
| 4.5 | 2 | 5 | .848 | .00027 | 8.6 |
| 31.5 | 20 | 42 | .585 | .01166 | 44.5 |
| 4 | 2 | 5 | .678 | .00078 | 8.7 |
| 17.5 | 7 | 20 | .807 | .00139 | 14.5 |
| 12.5 | 7 | 15 | .737 | .00161 | 15.4 |
| 42.5 | 22 | 50 | .765 | .00452 | 47.9 |

The low density spacer fluids also exhibit better than expected wellbore cleaning properties, because the density reducing bodies act as scrubber particles to scour the annulus to ensure a better cement bond.

Whereas the present invention has been described in particular relation to the drawings and tests here, it should be understood that other and further modifications, apart from those shown or suggested herein, may be made within the scope and spirit of the invention.

We claim:

1. A method of completing a wellbore wherein a completion fluid is introduced into the wellbore to displace existing fluids out from a portion thereof, which comprises:
    displacing any existing fluids in said wellbore with a low density spacer fluids;
    displacing said low density spacer fluid in said wellbore with a completion fluid;
    wherein said low density spacer fluid comprises a carrier fluid and discrete dispersible density reducing bodies.
2. The method of claim 1 wherein said carrier fluid is in aqueous fluid.

3. The method of claim 1 wherein said carrier fluid is a hydrocarbon-based fluid.

4. The method of claim 1 wherein said low density spacer fluid includes a viscosifying agent.

5. The method of claim 4 wherein said viscosifying agent is a clay material.

6. The method of claim 5 wherein said viscosifying agent is bentonite.

7. The method of claim 1 wherein said density reducing bodies are hollow spheres.

8. The method of claim 7 wherein said hollow spheres are hollow glass microspheres.

9. A method of claim 1 wherein said density reducing bodies are float ash.

10. A method of claim 1 wherein the viscosity of said low density spacer fluid is from about 15 cp to about 900 cp.

11. A method of claim 1 wherein said density reducing bodies are added to the carrying fluid in an amount from about 1 to about 5 pounds to each gallon of carying fluid.

12. The method of claim 5 wherein said viscosifying agent is added to the carrying fluid in the amount from about 1 to about 45 pounds to each barrel of carrying fluid.

13. A low density spacer fluid for introduction into a wellbore, consisting essentially of:
a nonagglomerating carrying fluid and a dispersion therein of discrete dispersible density reducing bodies.

14. The fluid of claim 13 wherein said carrier fluid is water.

15. The fluid of claim 13 wherein said carrier fluid is a hydrocarbon-based fluid.

16. The fluid of claim 13 and including a viscosifying agent.

17. The fluid of claim 13 wherein said density reducing bodies are hollow spheres.

* * * * *